(12) United States Patent
Salaka

(10) Patent No.: US 8,160,806 B2
(45) Date of Patent: Apr. 17, 2012

(54) LOAD-SENSING SYSTEMS FOR LIGHT-DUTY TRUCKS

(75) Inventor: George Salaka, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 833 days.

(21) Appl. No.: 12/235,681

(22) Filed: Sep. 23, 2008

(65) Prior Publication Data

US 2010/0076673 A1   Mar. 25, 2010

(51) Int. Cl.
  *G06F 17/10* (2006.01)
  *G01G 19/08* (2006.01)
(52) U.S. Cl. ............... 701/124; 177/46; 177/137
(58) Field of Classification Search ............ 177/46, 177/136, 137; 701/124
  See application file for complete search history.

(56) References Cited

U.S. PATENT DOCUMENTS

| | | | | |
|---|---|---|---|---|
| 4,231,450 A * | 11/1980 | Hedtke et al. | | 187/222 |
| 4,511,974 A * | 4/1985 | Nakane et al. | | 701/124 |
| 4,836,578 A * | 6/1989 | Soltis | | 280/6.15 |
| 5,031,934 A | 7/1991 | Soltis | | |
| 5,083,454 A | 1/1992 | Yopp | | |
| 7,276,669 B2 * | 10/2007 | Dahl et al. | | 177/45 |
| 2005/0040611 A1 * | 2/2005 | Williston et al. | | 280/6.159 |
| 2006/0109099 A1 * | 5/2006 | Darroman | | 340/440 |

FOREIGN PATENT DOCUMENTS

| | | |
|---|---|---|
| CN | 2785906 Y | 6/2006 |
| EP | 1 627 803 | 2/2006 |
| GB | 2 332 279 | 6/1999 |
| JP | 63063924 | 3/1988 |
| JP | 6323894 | 11/1994 |
| JP | 2006199099 | 8/2006 |
| KR | 20020000570 | 1/2002 |

* cited by examiner

*Primary Examiner* — Tony H. Winner
*Assistant Examiner* — Marc Scharich
(74) *Attorney, Agent, or Firm* — Franklin MacKenzie; Ford Global Technologies, LLC

(57) ABSTRACT

Systems are provided to avoid overloading a truck's bed and/or overloading a truck's towing capacity. Systems are also provided to detect and alert drivers of unbalanced loads.

4 Claims, 2 Drawing Sheets

LOAD-SENSING SYSTEMS FOR LIGHT-DUTY TRUCKS

TECHNICAL FIELD

This disclosure relates to load-sensing systems for trucks to avoid or prevent overloading truck beds and/or the towing capacity of a light-duty truck.

BACKGROUND

Light-duty trucks have grown in popularity relative to heavy-duty trucks in part because of their ability to achieve higher gas mileage. Due to the ever-increasing prices for oil and gas, the need for lighter weight and lighter duty trucks is expected to continue to grow.

Many truck owners, however, still choose to purchase a truck rather than a car because they have a need to carry loads that are less than ideal for cars to carry. For example, trucks with an open bed are more able to accommodate oddly shaped and large objects that may need to be carried when a vehicle owner moves from one residence to another. Additionally, a vehicle owner may prefer to pull a recreational vehicle such as a snowmobile or a jet ski with a truck rather than a car. A light-duty truck might be ideal for a consumer who will use the vehicle primarily as a commuter vessel, but who occasionally needs to carry loads that are less than suitable for cars.

Light-duty trucks sometimes have a physical appearance that is similar to that of a heavy duty truck. For this reason, it may be tempting for drivers of such vehicles to attempt to use light-duty trucks as though they were heavy-duty trucks on occasion. Such use can be problematic, however. For example, such use can reduce gas mileage performance of the light-duty truck. Such use can also harm the light-duty truck in many ways, including placing undue wear and tear on a suspension system and additional strain on the engine.

In presently available systems for light-duty trucks, it may be difficult for a light-duty truck driver to know when he or she has overloaded the vehicle bed or overloaded the towing capacity of the truck, or has an unbalanced load. Thus, he or she can unwittingly carry a load that is higher than that for which the truck is rated, and the load may be uneven.

It would therefore be desirable to provide a system for light-duty truck drivers so that they could readily know, when carrying a load in a truck bed or towing a trailer, whether the load is within the recommended limit for the truck or whether the recommended limit has been exceeded. It is desirable for such a system to be able to detect uneven loads. It is also desirable for such a system to be simple to manufacture, install and use. It is also desirable for such a system to be cost-effective.

SUMMARY

Systems are provided to address, at least in part, one or more of the needs or desires left unaddressed by prior systems and methods.

A system to avoid overloading a truck bed is provided. The system includes a sensing system to detect height or weight of a truck bed. The system also includes a controller to compare the sensed value with a predetermined threshold. If the sensed value differs from the threshold in a predetermined manner, a signal is configured to trigger a warning to the driver.

A system to avoid overloading a truck's towing capacity is also provided. The system includes a sensing system to determine the angle of an accelerator pedal. The system also includes a controller to compare the sensed angle and a speed of the truck against predetermined threshold relationships of accelerator pedal angle and truck speed. If the speed of the truck is lower than the expected truck speed identified in the predetermined threshold relationship for the sensed angle, a signal is configured to trigger a warning to the driver.

Another system to avoid overloading a truck's towing capacity is provided. The system includes a sensing system to determine towing strain. A controller in the system is configured to compare the sensed strain against a predetermined threshold. If the sensed strain is greater than the threshold, a signal is configured to trigger a warning to the driver.

These and other embodiments will become apparent upon a reading of the application and appended claims, without departing from the scope and spirit of the invention as set forth in the claims.

DETAILED DESCRIPTION

Figure 1:
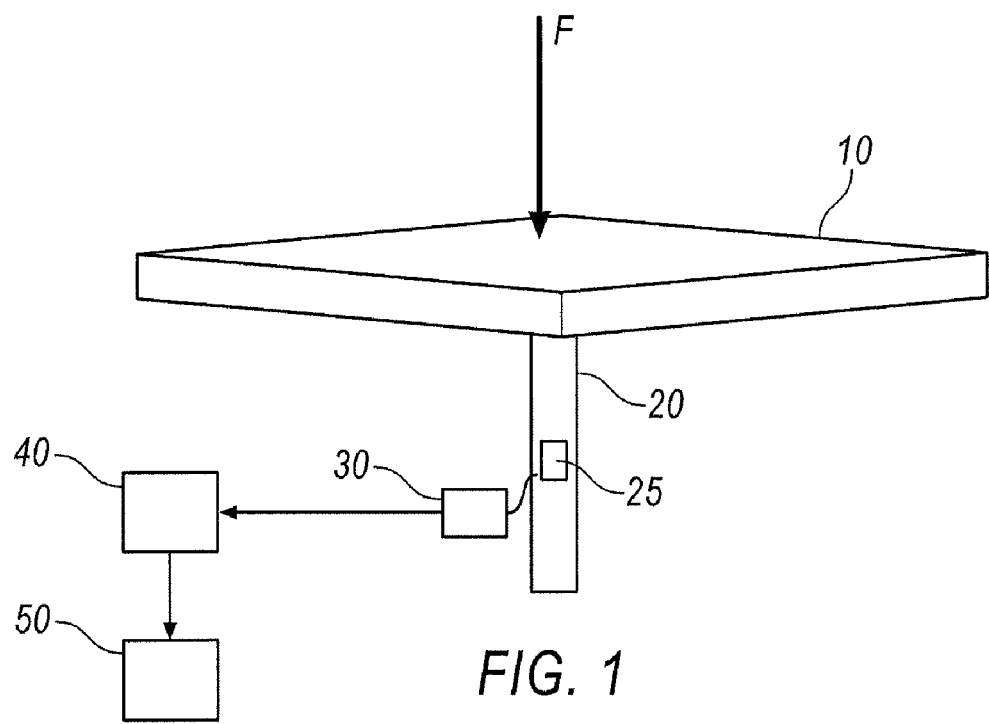
FIG. 1. depicts a height-based sensing system for determining a load in a truck bed.

FIG. 1 depicts a height-based sensing system for determining a load in a truck bed 10. When a load is placed in truck bed 10, it applies a downward force F, acting on the truck bed 10 and, in turn, suspension component 20. As the magnitude of F increases, truck bed 10 lowers.

Suspension component 20 may contain one or more embedded height sensors 25 or may be in communication with one or more height sensors 25 which can determine the relative height of the truck bed 10. In instances where multiple height sensors 25 are used, height sensors 25 may be positioned so that the evenness of the truck bed 10 can be determined. For example, height sensors 25 in a rear right location might sense a lower height of truck bed 10 than height sensors 25 in a front left location of truck bed 10. Height sensors 25 may be any known height sensors, analog or digital, including those described in U.S. Pat. No. 5,031, 934 or 5,083,454, both of which are incorporated by reference in their entireties. One or more of the height sensors 25 may comprise or be in communication with a Hall-effect device 30.

In a low-cost illustrative example involving multiple Hall-effect devices 30 on or in communication with suspension component 20, the Hall-effect devices 30 send a signal to controller 40 indicating the height of the truck bed 10. The controller 40 may contain logic that determines whether sensed evenness of the load falls within predetermined ranges. If the load is uneven (the difference between the highest sensor 25 and the lowest sensor 25 is greater than a predetermined value), a signal may be sent to a warning system 50 to alert the driver. The warning system 50 may be any known auditory and/or visual warning system.

The controller 40 may also contain logic that calculates an average height from the input of the multiple height sensors 25 and/or Hall-effect devices 30. In this case, the controller 40 compares the sensed (or averaged) height of the truck bed 10 and compares it to a threshold value. If the height is lower than the predetermined threshold for height, a signal may be sent to a warning system 50 to alert the driver. The warning system 50 may be any known auditory and/or visual warning system.

Figure 2:
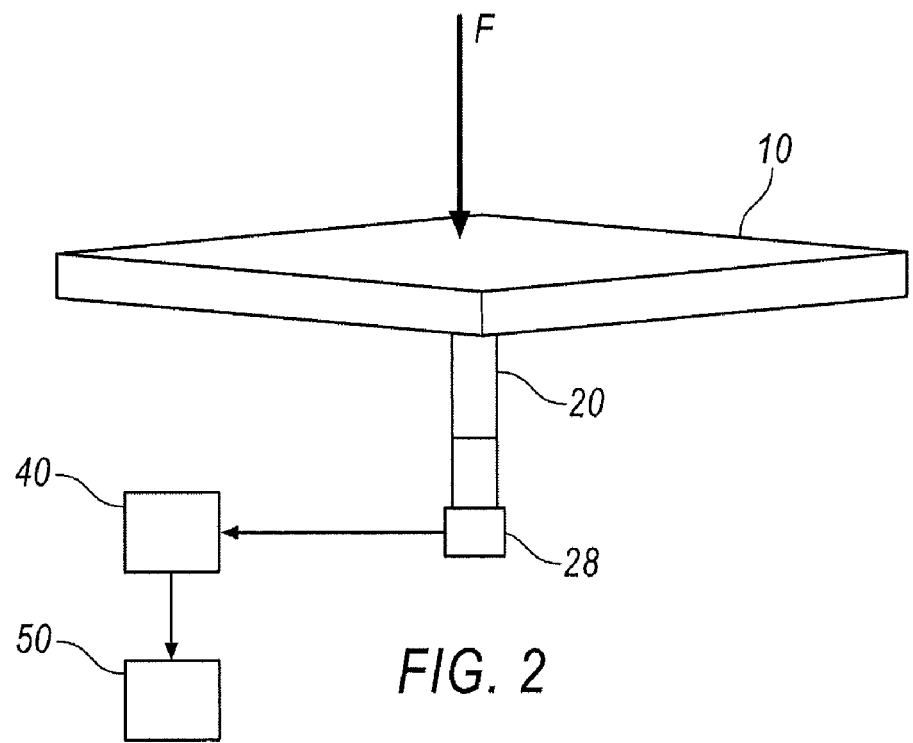
FIG. 2. depicts a weight-based sensing system for determining a load in a truck bed.

FIG. 2 depicts a weight-based sensing system for determining a load in a truck bed 10. When a load is placed in truck bed 10, it applies a downward force F, acting on the truck bed 10 and, in turn, suspension component 20. As the magnitude of F increases, the weight of the truck bed 10 acting on the suspension component 20 increases.

Suspension component 20 may contain one or more embedded weight sensors 28 or may be in communication with one or more weight sensors 28 which can determine the weight of truck bed 10 with its load therein. In instances where multiple weight sensors 28 are used, weight sensors 28 may be positioned so that the evenness of the load in truck bed 10 can be determined. For example, weight sensors 28 in a rear right location might sense a greater weight of truck bed 10 than weight sensors 28 in a front left location of truck bed 10. Weight sensors 28 may be any known weight sensors, including load cells, pressure sensors in an air suspension, etc. An electronic module may supply power to the weight sensor 28 and provide the associated buffer circuitry to transform a signal that is emitted from the weight sensor 28 into an operator indicator.

In an illustrative example involving multiple weight sensors 28 on or in communication with suspension component 20, the weight sensors 28 send a signal to controller 40 indicating the weight of the truck bed 10. The controller 40 may contain logic that determines whether sensed evenness of the load falls within predetermined ranges. If the load is uneven (the difference between the sensor 28 detecting the greatest weight and the sensor 28 detecting the lowest weight is greater than a predetermined value), a signal may be sent to a warning system 50 to alert the driver. The warning system 50 may be any known auditory and/or visual warning system.

The controller 40 may also contain logic that calculates an average weight from the input of the multiple weight sensors 28. In this case, the controller 40 compares the sensed (or averaged) weight of the truck bed 10 and compares it to a threshold value. If the weight exceeds the predetermined threshold for weight, a signal may be sent to a warning system 50 to alert the driver. The warning system 50 may be any known auditory and/or visual warning system.

Figure 3:
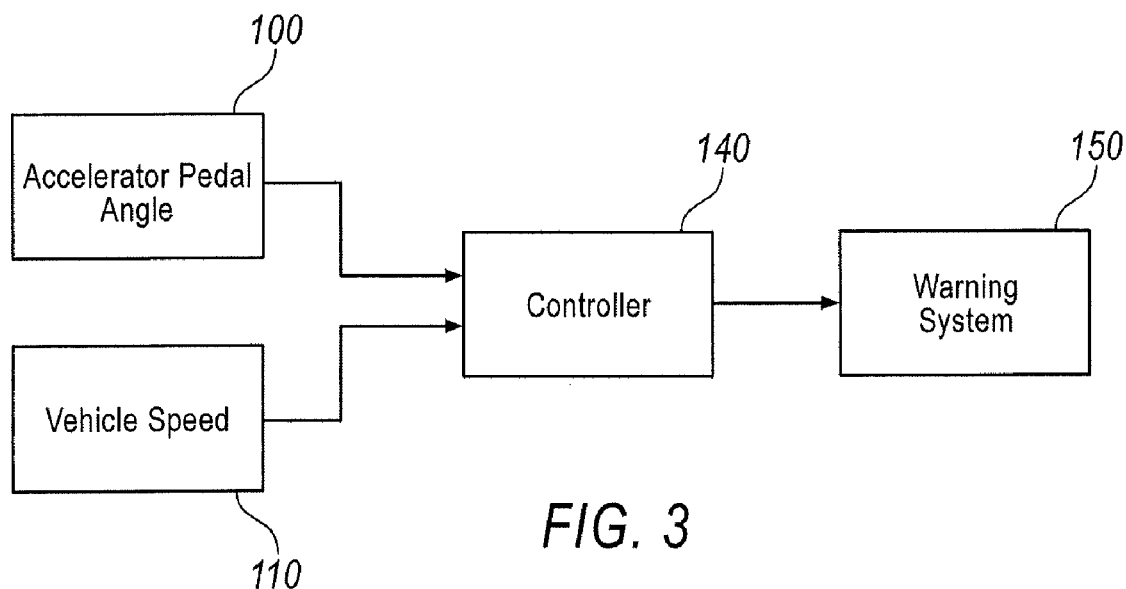
FIG. 3. depicts a system for determining whether a truck's carrying or towing capacity is overloaded.

FIG. 3 depicts a system for determining whether a truck's carrying or towing capacity is overloaded. In FIG. 3, two sensed inputs 100 and 110 are provided to controller 140. Input 100 relates to the angle between the accelerator pedal and a floor board of the truck. Input 110 relates to speed of the truck. Under conditions where there is no load in a truck's bed and a truck is not towing any object, the angle of the accelerator pedal has a known relationship with the speed of the truck. As the angle grows more acute, the speed is increased, generally. The relationship need not be linear. In situations where a truck is carrying or towing a load of any kind, the angle of the accelerator pedal must become more acute to achieve the same speed as it would without a load. There is a pre-determined limit to how acute the angle must become to achieve a particular speed. Stated another way, when the angle of the accelerator pedal to the floor board is at a certain value, the truck must be going at a minimum speed unless there is undue strain on the truck from carrying or towing a load. In other words, there is a pre-determined minimum speed for particular angles of the accelerator pedal relative to the floor board, below which the load being carried by the truck is too taxing. At some point, for any given vehicle, a carrying or towing load puts too much strain on a vehicle. Logic in the controller 140 can compare the inputs 100 and 110 to predetermined thresholds to determine whether the load being carried or towed is too taxing on the truck. If it is, a signal can be sent to indicate an overload.

If the threshold or thresholds are exceeded (angle too low to achieve a speed or speed too low for a particular angle), then a signal may be sent to a warning system 150 to alert the driver. The warning system 150 may be any known auditory and/or visual warning system.

Figure 4:
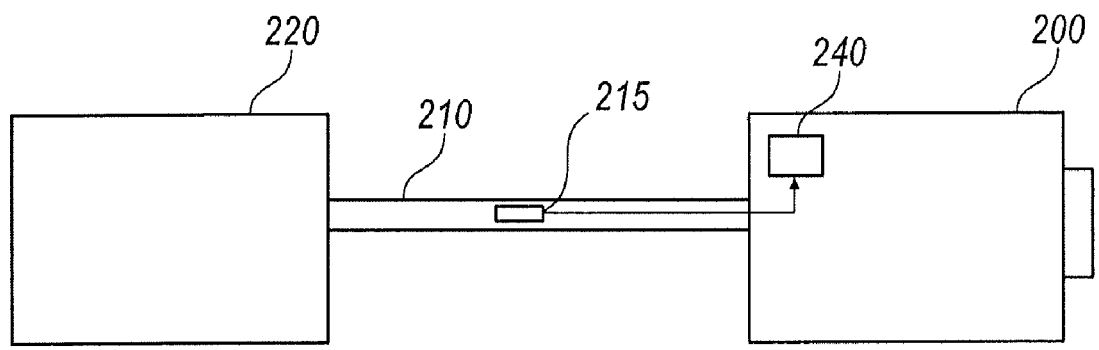
FIG. 4. depicts a system for determining whether a truck's towing capacity is overloaded.

FIG. 4 depicts a system for determining whether a truck's towing capacity is overloaded. In the depicted illustrative example, truck 200 is pulling trailer 220 using hitch 210. Hitch 210 may include one or more embedded sensors 215. Embedded sensors 215 can be any known sensor, including a strain gauge. An electronic module can provide the power and the buffer circuitry for the sensors 215.

In the case where embedded sensor 215 is a strain gauge, it sends an electrical analog signal that corresponds to the stretching of the hitch 210 by the weight of the towing load. This signal is sent to controller 240. In controller 240, logic is provided to determine whether the strain is over a predetermined threshold. If so, then a signal may be sent to a warning system to alert the driver. The warning system may be any known auditory and/or visual system. It may display or announce qualitative information, such as "Overload," and/or it may display or announce quantitative information, such as precise weights and/or the amount of weight over the threshold.

Any one of the exemplary systems described above may be implemented independently or in combination with one another.

While at least one embodiment of the appended claims has been described in the specification, those skilled in the art recognize that the words used are words of description, and not words of limitation. Many variations and modifications are possible without departing from the scope and spirit of the invention as set forth in the appended claims.

I claim:

1. A system to avoid overloading a light-duty truck bed, comprising:
   (a) a sensing system to detect height and weight of the truck bed; said sensing system comprising at least one digital height sensor and at least one weight sensor; said sensing system carried on a truck suspension below said truck bed;
   (b) a controller electronically connected to both said at least one digital height sensor and said at least one weight sensor to receive at least one signal therefrom; said controller to compare a sensed truck bed height and a sensed truck bed weight with a predetermined truck bed height threshold and a predetermined truck bed weight threshold; and
   (c) a warning alert system configured to be triggered by said at least one signal if either the sensed truck bed height is less than the predetermined truck bed height threshold or if the sensed truck bed weight is greater than the predetermined truck bed weight threshold.

2. The system of claim 1, wherein the at least one weight sensor comprises a load cell.

3. The system of claim 1, wherein the warning alert system is visual.

4. The system of claim 1, wherein the warning alert system is auditory.

* * * * *